United States Patent [19]

Lai

[11] Patent Number: 5,588,766

[45] Date of Patent: Dec. 31, 1996

[54] ASCENDING/DESCENDING STRUCTURE

[76] Inventor: Yu-Shan Lai, F4-3, No. 288, Tzu-Yu Rd., Chia-I Hsien, Taiwan

[21] Appl. No.: 583,821

[22] Filed: Jan. 11, 1996

[51] Int. Cl.⁶ ..................................................... F16B 7/14
[52] U.S. Cl. ........................... 403/105; 403/107; 403/104; 248/297.31; 297/411.36
[58] Field of Search .................................. 403/105, 104, 403/106, 107, 108, 83, 109, 377, 321, 322, 325; 248/297.31, 298.1, 408; 297/411.36, 344.19

[56] References Cited

U.S. PATENT DOCUMENTS

| | | | |
|---|---|---|---|
| 1,831,613 | 11/1931 | Symons | 403/105 X |
| 3,161,395 | 12/1964 | Carter | 403/105 X |
| 4,190,377 | 2/1980 | Pleuss | 403/108 |
| 4,639,039 | 1/1989 | Donovan | 248/297.31 X |
| 4,982,981 | 1/1991 | Fourrey et al. | 248/297.31 X |
| 5,138,911 | 8/1992 | Lan | 403/108 X |
| 5,265,938 | 11/1993 | Melhuish | 297/411.36 |
| 5,324,096 | 6/1994 | Schultz | 297/411.36 |
| 5,435,626 | 7/1995 | Lai | 297/411.36 |

*Primary Examiner*—Harry C. Kim
*Attorney, Agent, or Firm*—Browdy and Neimark

[57] ABSTRACT

An ascending/descending structure including a pull bar, a locking pin, a resilient retaining member and a locking tube formed with saw teeth-like locking notches for reliably locking the locking pin. The pull bar can be pulled outward along the locking tube for adjustment of height without slipping off or displacement. When the pull bar is reversely pushed inward, by the guide slot of the retaining member, the locking pin temporarily kept in a fixed position, permitting the pull bar to be pushed inward to the bottom of the locking tube for further adjustment of height.

1 Claim, 4 Drawing Sheets

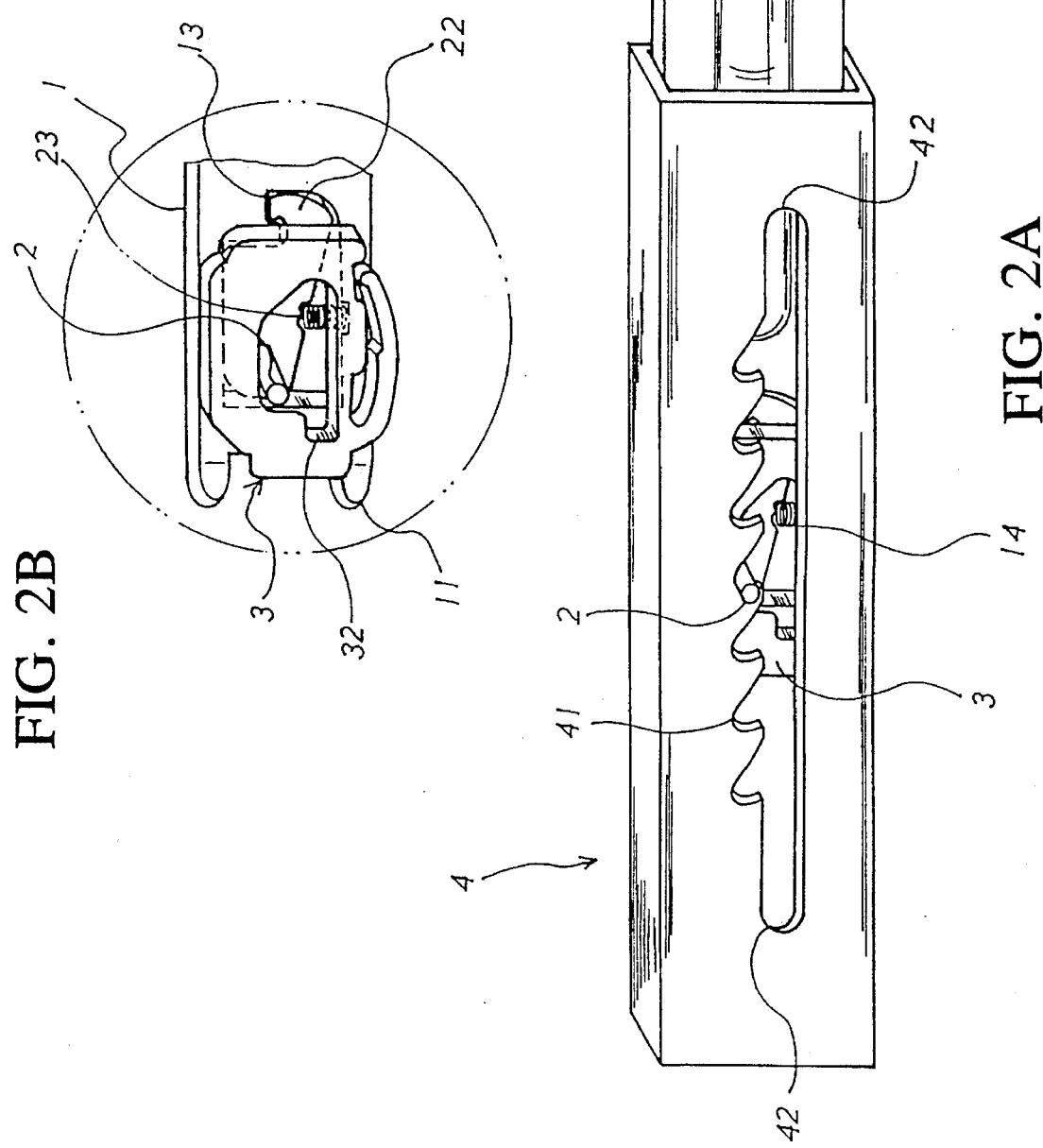

ASCENDING/DESCENDING STRUCTURE

BACKGROUND OF THE INVENTION

The present invention relates to an ascending/descending structure in which the pull bar can be smoothly pulled outward along the locking tube for adjustment of height without slipping off or displacement. In addition, the pull bar can be reversely pushed inward to the bottom of the locking tube for further adjustment of height.

Many kinds of appliances around us include ascending/descending structures, such as a foldable umbrella, adjustable stem of an electric fan, arm rest of a chair, etc. In various conventional ascending descending structures, several common shortcomings exist as follows:

1. Poor adjustment: The ascending/descending member is locked on a stem by a screw after each adjustment. Therefore, the screwing operation is often repeatedly performed during use of the appliances. This causes great inconvenience to a user. Moreover, with respect to a thread hole design, the screw must be first aligned with the thread hole prior to locking of the ascending/descending member. It is quite troublesome to do this.
2. Poor supporting effect: By means of the screw, the ascending/descending member often can be hardly firmly locked and thus it can hardly bear any additional load. As a result, the application field of such ascending/descending structure is quite limited.

SUMMARY OF THE INVENTION

It is therefore a primary object of the present invention to provide an ascending/descending structure including a pull bar, a locking pin, a resilient retaining member and a locking tube formed with saw teeth-like locking notches for reliably locking the locking pin. The present invention has the following advantages:

1. The locking notches of the locking tube provide multiple locking stages for the pull bar so that the pull bar can be adjustably located on different heights.
2. The locking pin is firmly and reliably locked the locking notch of the locking tube without slipping off. Therefore, the structure can bear greater load.
3. The adjustment of the present invention is achieved by pulling/pushing movement without using any screw so that the operation is more easily performed.

The present invention can be best understood through the following description and accompanying drawings, wherein:

BRIEF DESCRIPTION OF THE DRAWINGS

FIG. 2 is a sectional assembled view of the present invention; and

DETAILED DESCRIPTION OF THE PREFERRED EMBODIMENT

Figure 1:
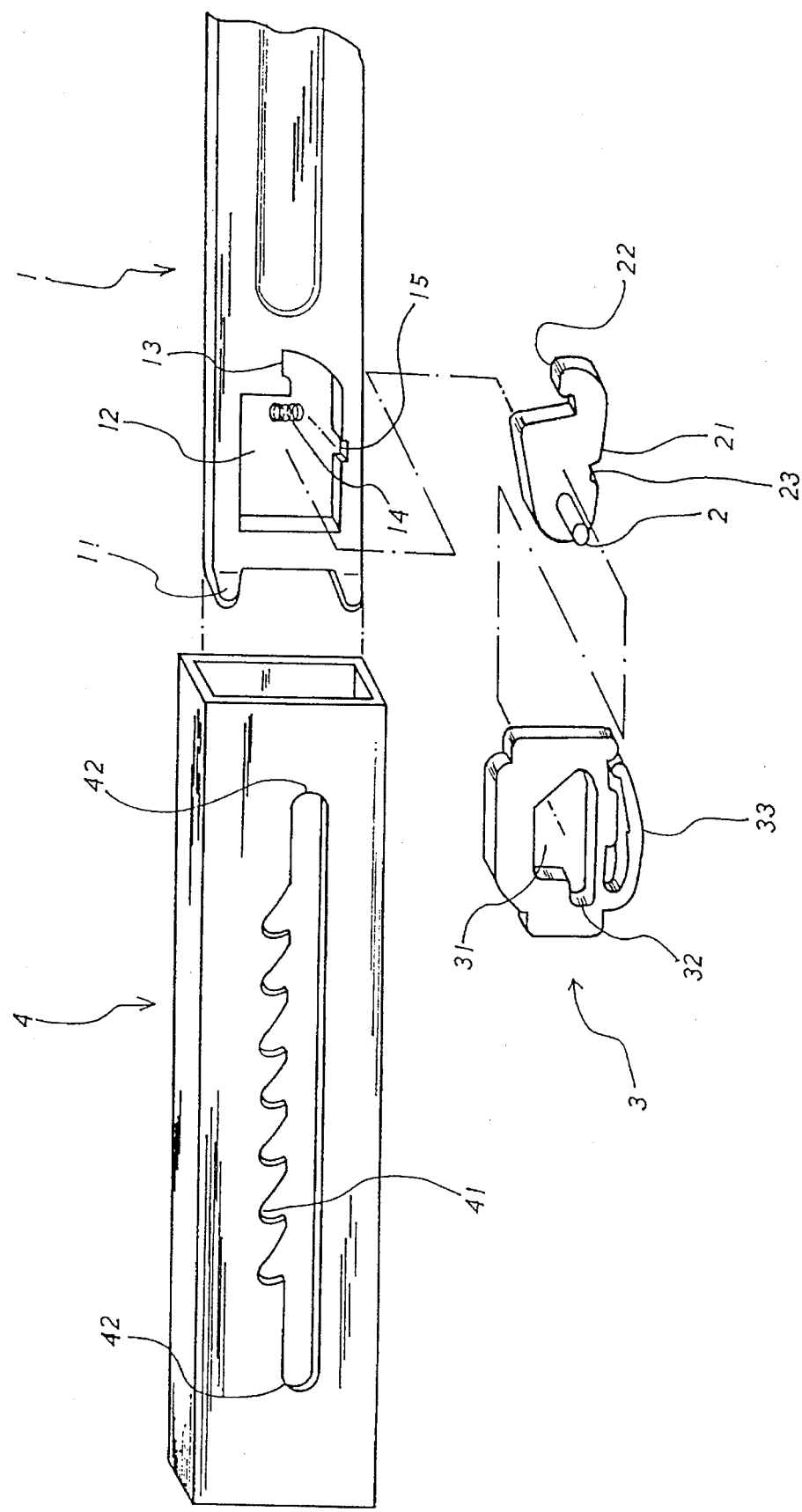
FIG. 1 is a perspective exploded view of the present invention.
Figure 3A:
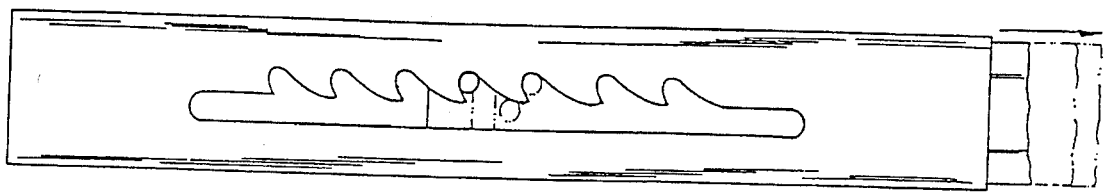
FIG. 3 shows the operation of the present invention.
Figure 3B:
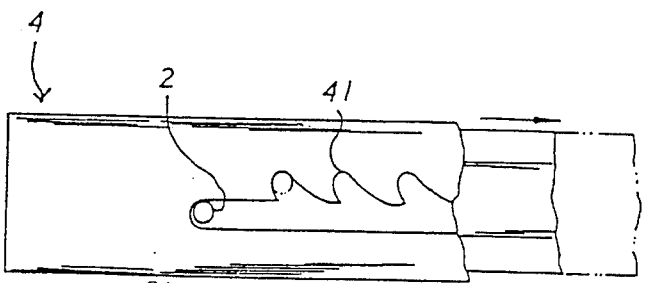
Figure 3C:
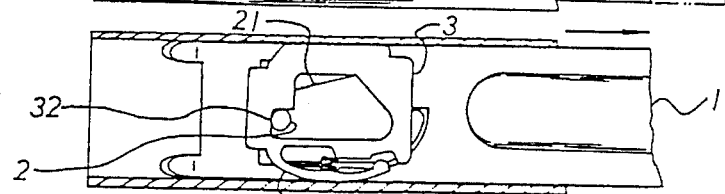
Figure 3D:
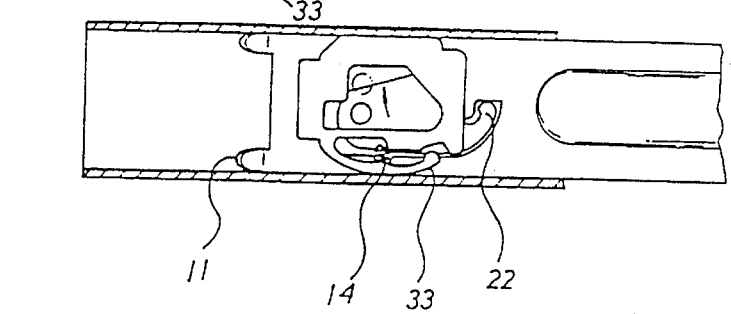
Figure 3E:
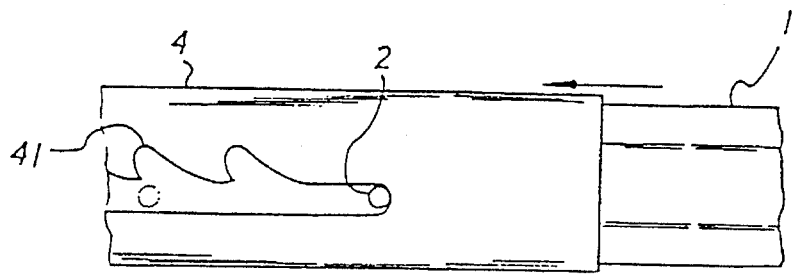
Figure 3F:
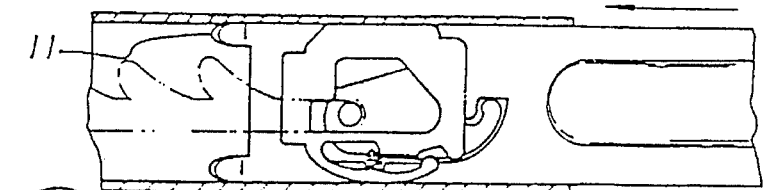
Figure 3G:
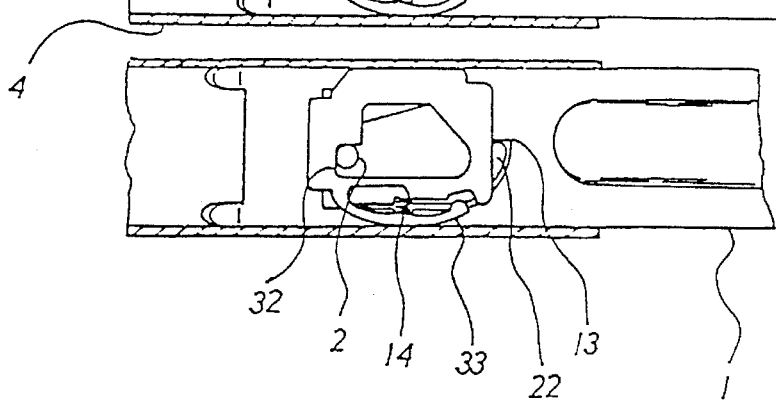
Figure 3H:
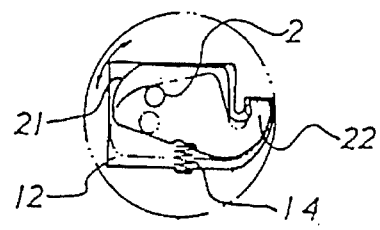

Please refer to FIGS. 1 to 3. The present invention includes a pull bar 1, a locking pin 2, a resilient retaining member 3 and a locking tube 4.

The pull bar 1 is a rectangular bar having bent stopper portions 11 at bottom end for limiting the moving range of the retaining member 3. A substantially rectangular window 12 is formed on the pull bar 1 near the bottom end thereof, having a hook-like slot 13 for limiting the movement of a hooking portion 22 of the locking pin seat 21. In addition, a recess 15 is formed in the window 12 for retaining a spring 14.

The locking pin 2 is cylindrically shaped and integrally connected with a board-like locking pin seat 21 having a rearward extending reverse hooking portion 22 corresponding to the hook-like slot 13 of the window 12. The locking pin seat 21 is formed with an arch dent 23 pushable by the spring 14 in the window 12 so as to keep the locking pin seat 21 on one side of the window 12.

The resilient retaining member 3 is plate-like and made of resilient material, formed with a window 31 having an extending guide slot 32 for engaging with the locking pin 2. In addition, a resilient arm 33 extends from one side of the retaining member 3 for abutting against inner wall of the locking tube 4.

The locking tube 4 is a hollow rectangular bar formed with saw teeth-like locking notches 41 on one side and two locating slots 42 extending respectively from two sides of the locking notches 41.

The locking pin seat 21 is placed in the window 12 of the pull bar 1 with the spring 14 aligned with the arch dent 23 of the locking pin seat 21. The retaining member 3 is disposed on the locking pin seat 21 and the pull bar 1 with the locking pin 2 passing through the window 31 and the guide slot 32 facing toward the stopper portions 11. At this time, the resilient arm 33 is on the same side as the hook-like slot 13 as shown in FIG. 2 and the retaining member 3 can be slided along the pull bar 1 through a certain distance. Then the pull bar 1, locking pin 2 and the resilient retaining member 3 is placed into the locking tube 4 to complete the assembly.

When using the present invention, because the spring 14 forces the locking pin 2 into a locking notch 41, each time the pull bar 1 is pulled outward by one tooth, the locking pin 2 is lifted to be located in one of the locking notches 41. This prevents the pull bar 1 from inward slipping due to external force. In addition, when it is desired to descend the pull bar 1, the pull bar 1 is first pulled outward to a limitation position with the locking pin 2 limited within the locating slot 42. At this time, the guide slot 32 of the retaining member 3 and the locating slot 42 together define a close rectangular space. The pull bar 1 is then pushed inward with the resilient arm 33 abutting against the inner wall of the locking tube to temporarily keep the retaining member 3 in a fixed position. (This is because the upward and downward movement of the resilient retaining member 3 is caused by the pushing of the stopper portions 11 and the locking pin 2.) Therefore, the locking pin 2 will enter the guide slot 32 to be limited therewithin without acting the locking notches 41 as shown in FIG. 3. Accordingly, the pull bar 1 can be smoothly pushed toward the bottom of the locking tube 4 into another locating slot 42. At this time, when the pull bar 1 is outward pulled again, due to the abutting of the retaining member 3 against the locking tube 4, the retaining member 3 temporarily will not be slided. This leads to detachment of the locking pin 2 from the guide slot 32 to be again forced by the spring 14 for locking the pull bar 1 in further ascending/descending operation.

The above embodiment is only an example of the present invention and the scope of the present invention should not be limited to the example. Any modification or variation derived from the example should fall within the scope of the present invention.

What is claimed is:

1. An ascending/descending structure comprising a pull bar, a locking pin having a board-like locking pin seat with a rearwardly extending reverse hooking portion, a resilient retaining member, and a locking tube having saw tooth-like locking notches, said structure being characterized in that:

the pull bar is a rectangular bar having bent stopper portions at a bottom end for limiting movement of the resilient retaining member, a substantially rectangular window being formed on the pull bar near the bottom end thereof, the rectangular window having a hook-like slot thereon for limiting a movement of the rearwardly extending reverse hooking portion, a recess being formed in the rectangular window for retaining a spring therein;

the locking pin is a cylindrically shaped member integrally connected with the board-like locking pin seat, the rearwardly extending reverse hooking portion corresponds to the hook-like slot of the window of the pull bar, the board-like locking pin seat being formed with an arch dent pushable by the spring in the window of the pull bar so as to keep the locking pin abutting against one of the saw tooth-like locking notches of the locking tube;

the resilient retaining member is a plate-like member made of a resilient material, the resilient retaining member is formed with a window having an extending guide slot for engaging with the locking pin, a resilient arm extending from one side of the resilient retaining member for abutting against an inner wall of the locking tube;

the locking tube is a hollow rectangular bar formed with the saw tooth-like locking notches on one side and two locating slots extending respectively from two sides of the saw tooth-like locking notches; and the board-like locking pin seat is placed in the rectangular window of the pull bar with the spring aligned with the arch dent of the board-like locking pin seat, the resilient retaining member being disposed on the board-like locking pin seat and the pull bar with the locking pin passing through the window of the resilient retaining member, the extending guide slot facing toward the bent stopper portions, the resilient arm being on the same side as the hook-like slot of the pull bar, wherein the pull bar, the locking pin, and the resilient retaining member are placed into the locking tube, the spring forcing the locking pin into said one of the saw tooth-like locking notches to be locked therein, whereby when it is desired to descend the pull bar, the pull bar being first pulled outward to a limitation position with the locking pin limited within the extending guide slot of the resilient retaining member and then pushed inward.

* * * * *